(12) United States Patent
Jason et al.

(10) Patent No.: US 6,636,520 B1
(45) Date of Patent: Oct. 21, 2003

(54) METHOD FOR ESTABLISHING IPSEC TUNNELS

(75) Inventors: James L. Jason, Hillsboro, OR (US); Michael D. Jeronimo, Wilsonville, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,962

(22) Filed: Dec. 21, 1999

(51) Int. Cl.$^7$ .......................... H04L 12/28; H04L 12/56

(52) U.S. Cl. .................. 370/401; 370/410; 370/466; 713/153; 713/166; 713/189

(58) Field of Search ........................... 370/400, 401, 370/409, 466, 351, 352, 353, 354, 355, 356, 395.1, 389, 396, 397, 410, 392; 713/153, 163, 166, 162, 164, 168, 189, 190

(56) References Cited

U.S. PATENT DOCUMENTS

| | | | | |
|---|---|---|---|---|
| 5,898,784 A | * | 4/1999 | Kirby et al. | 713/153 |
| 6,157,649 A | * | 12/2000 | Peirce et al. | 370/401 |
| 6,434,156 B1 | * | 8/2002 | Yeh | 370/401 |

* cited by examiner

*Primary Examiner*—Dang Ton
*Assistant Examiner*—Inder Pal Mehra
(74) *Attorney, Agent, or Firm*—Blakely, Sokoloff, Taylor & Zafman LLP (57) ABSTRACT

A method and a system for establishing network tunnels are disclosed. In one embodiment, a transport action is identified in response to packet parameters. Once the transport action is determined, the transport action is pushed onto a pending stack. When a tunnel action is, subsequently, identified in response to the packet parameters, the tunnel action is also pushed onto the pending stack. Upon completion of rule evaluation, at least one tunnel is established according to a tunnel action stored in the pending stack. The action stored at the top of the pending stack is performed first and the action stored at the bottom of the pending stack is performed last.

21 Claims, 7 Drawing Sheets

METHOD FOR ESTABLISHING IPSEC TUNNELS

BACKGROUND OF THE INVENTION

1. Field of the Invention

The present invention relates generally to the field of network communication and, more specifically, the present invention relates to a method for establishing network tunnels.

2. Description of the Related Art

Computer technology is continuously advancing, providing newer computer systems with continuously improved performance. One result of this improved performance is an increased use of computer systems by individuals in a wide variety of business, academic and personal applications. In some instances, these computers are linked together by a network, such as, for example, the Internet, so that the systems can communicate with each other using network communications.

In a typical network communication, a data packet, which, for example, may contain audio and video ("AV") data, is used to transmit data between the systems. A packet is typically organized into a format according to a conventional network protocol, such as, for example, IP ("Internet Protocol"). IP allows a packet to pass across the Internet with the best-effort packet delivery service.

A problem with a conventional packet transmission across a network, such as the Internet, is the security of the packet. In other words, the content of the packet could be captured by an unintended party during the course of transmitting across the network. To enhance the packet security, various schemes have been developed, such as, for example, encrypted tunnels.

A tunnel is a virtual path that can be established between network nodes. A typical tunneling process encapsulates a packet with the source network into an intermediate network and the encapsulation is later removed before the packet reaches its destination node. Transport rules provide services that allow two or more machines to set up sessions so that machines can communicate with each other. Accordingly, a set of IPSEC (Internet Protocol Security) transport mode rules and tunnel mode rules are typically used to enhance the packet security.

However, a problem associated with the currently employed scheme is that the scheme performs only the first rule that it encounters. In other words, the currently employed scheme performs the first rule, which could be either an IPSEC transport mode rule or an IPSEC tunnel mode rule, that it encounters and ignores the remaining rules.

Therefore, there is a need to have a mechanism for establishing tunnels in response to multiple IPSEC rules.

SUMMARY OF THE INVENTION

A transport action is, in one embodiment, identified in response to packet parameters. Next, the transport action is pushed onto a pending stack. When a tunnel action is identified in response to the packet parameters, the tunnel action is pushed onto the pending stack. At least one tunnel is set up in response to the pending stack. The tunnel action stored at the top of the pending stack is performed first and the tunnel action stored at the bottom of the pending stack is performed last.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and a system for establishing tunnels in response to rules are described.

In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

Some portions of the detailed descriptions that follow are presented in terms of processes and symbolic representations of operations on data bits within a computer memory. These processing descriptions and representations are the tools used by those of [or] ordinary skill in the data processing arts to most effectively convey the substance of their work to others of ordinary skill in the art. A process is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, et. cetera.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying", et. cetera, refers to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

OVERVIEW

A mechanism of establishing multiple tunnels for transporting a packet is described. Actions, in one embodiment, include transport actions, which specify, how a packet should be transported, and tunnel actions, which indicate how to set up possible multiple tunnels. The mechanism, in one embodiment, includes a pending stack and a completed stack. The pending stack includes an order of actions to be performed. The completed stack indicates an order of actions to be removed or torn down.

In one embodiment, a transport action is identified in response to packet parameters. Packet parameters may include, but are not limited to, source address, destination address, and protocols. Once a transport action is determined, the transport action is pushed onto a pending stack. After completion of rule identification, at least one action may be performed according to an action stored in the pending stack. The action stored at the top of the pending stack is performed first and the action stored at bottom of the pending stack is performed last. Tunnels are, in one embodiment, established in this order because earlier tunnels are necessary so that the host may establish the subsequent tunnels.

When a tunnel or transport action is performed successfully, the action is stored or pushed onto a completed stack. However, when an action from the pending stack has failed to perform, such as, for example, a tunnel could not be established at the present time, the tunnels, which are already established, are going to be torn down. The removing tunnel action stored at the top of the completed stack is performed first and the action stored at the bottom of the completed stack is performed last.

Figure 1:
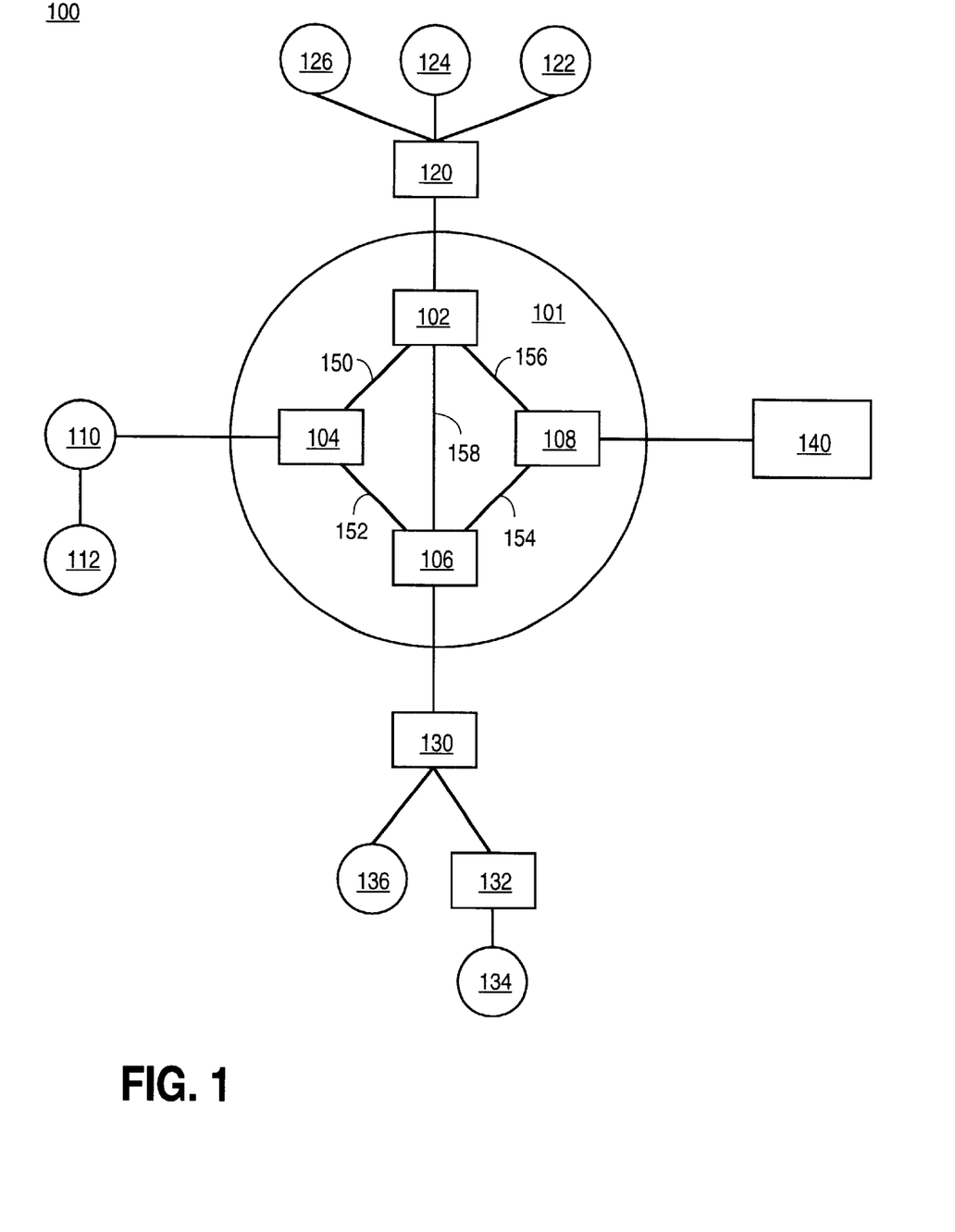
FIG. 1 illustrates one embodiment of a network having various hosts and nodes.

FIG. 1 illustrates one embodiment of a network configuration 100 having various nodes and hosts. Referring to FIG. 1, a network 101, hosts 120, 130, 132, 140, and nodes 110, 112 122, 124, 126, 134, and 136 are shown. A host is usually a host system, such as, for example, a conventional computer or a cluster of computers, and can support multiple nodes and sub-hosts. A function of the host is to distribute various packets to various nodes that attach to the host.

A node is a connecting point on a network where a device or devices can be attached to the node. A typical device can be a PC "personal computer", a printer, a fax machine, a telephone, and the like. A node can also connect to another node or nodes.

Network 101 contains four network servers 102, 104, 106, and 108, which are interconnected using various conventional connections 150–158. In one embodiment, network 101 is the Internet and the network may contain more than four servers. In this embodiment, server 102 is connected to server 104, 106, and 108 using connection 150, 158, and 156, respectively. Also, server 106 is connected to servers 104 and 108 using connections 152 and 154, respectively.

In one embodiment, network 101 is connected to hosts 120, 130, 140 and node 110 using conventional network connections. In this embodiment, while host 120 is connected to nodes 122, 124, and 126, host 130 is connected to node 136 and host 132. Host 132 is further connected to node 134 and node 110 is connected to node 112. Other nodes and hosts can be connected to network 101, but they are not necessary to understanding the invention.

Each node or host can access or communicate with any other node or host on the network. When a source node, in one embodiment, sends a packet to a destination node, the packet may have several alternative paths or routes to reach the destination node. In other words, a packet, which is sent from a source node, may have options to take one of many paths or routes to reach the destination node or host. However, a different path or route contains different characteristics, which includes, but is not limited to, speed of the packet in transmission and security requirements.

For example, host 130 sends a packet to host 102 where the packet is first sent to server 106. The next step is to send the packet to server 102 from server 106. The packet has three alternative paths to reach server 102. The first path is to send the packet from server 106 to server 102 via server 104 using connections 152 and 150. The second path is to send the packet from server 106 to server 102 via server 108 using connections 154 and 156. The third path is to send the packet directly from server 106 to 102 using connection 158. The third path may be a preferred path, in this example, because the packet takes less hops between servers to reach the destination server and consequently, the packet may take less time to reach server 102. Once the packet reaches server 102, node 120 receives the packet from server 102. Accordingly, the network administrator may allow the packet to take the third path if the packet has a high priority status and allows the packet to take the first or second path if the packet has a low priority status.

Network 101 may have more than four servers and more paths may be available to a packet to reach the destination node. Since different path offers different performance, the network administrator needs various rules and conditions to manage and control overall network communication performance. Rules and conditions commonly involve QOS, security requirements, and the like.

Figure 2:
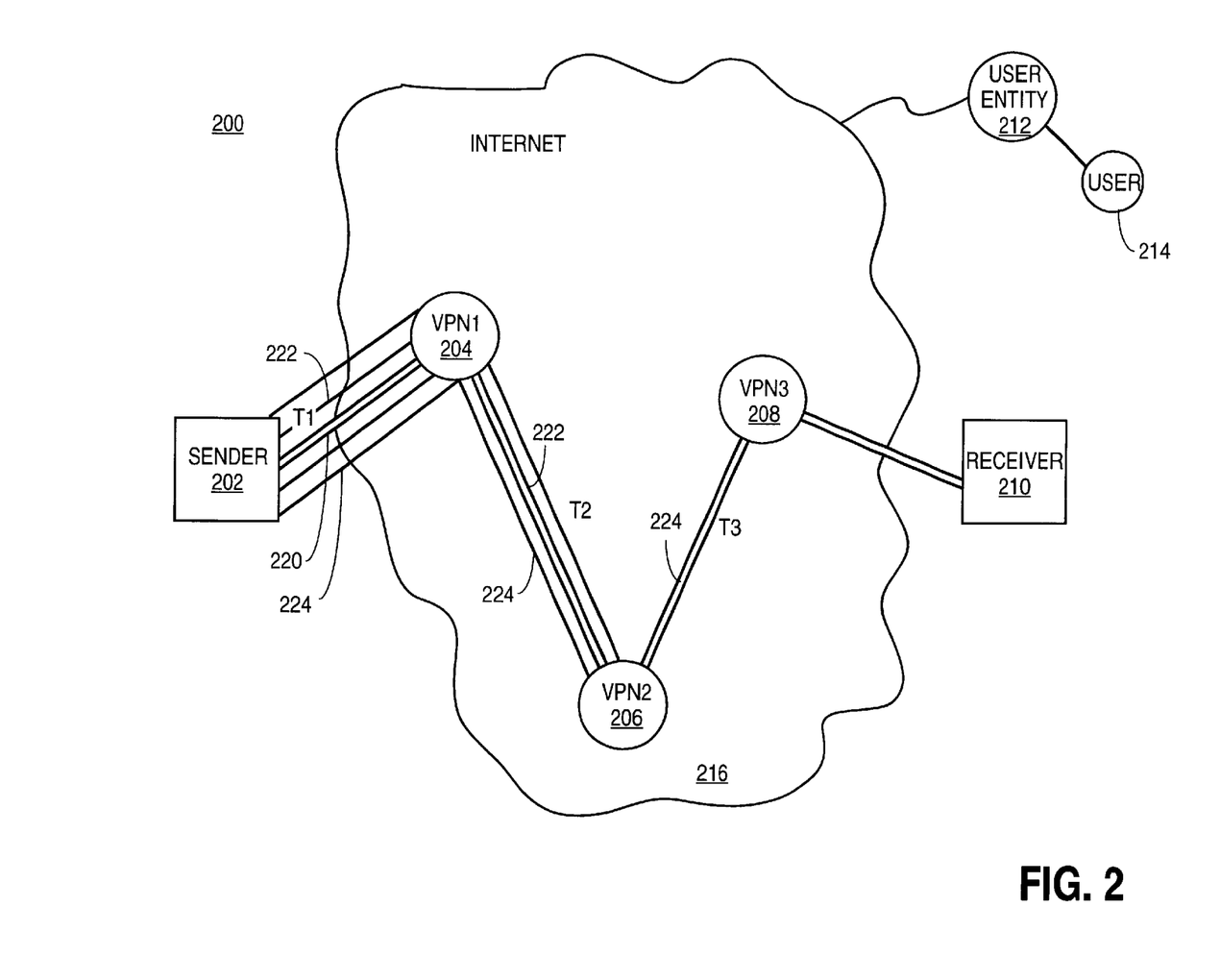
FIG. 2 illustrates one embodiment of a network having multiple tunnels.

FIG. 2 illustrates one embodiment of a network 200 having multiple tunnels. Referring back to FIG. 2, a sender node 202, a receiver node 210, and the Internet 216 are shown. The Internet 216 further includes three network nodes 204, 206, 208, which could be security gateways and termination points for tunnels. The first tunnel, T1 220 is coupled between sender node 202 and node 204, while the second tunnel T2, 222 is coupled between node 204 [202] and node 206. The third tunnel T3 224 is coupled between node 206 [202] and node 208. In one embodiment, the tunnels T1 220, T2 222, T3 224 may be encrypted to enhance IP security. These encrypted tunnels may be used to create Virtual Private Networks "VPNs".

A tunnel, in one embodiment, is a virtual network path that may use multiple network protocols to deliver a data packet. Tunnels may be established between security gateways and hosts. In one embodiment, a tunnel transports a packet using a foreign protocol across a network by encapsulating the packet into a tunnel format. A tunnel encapsulates a packet and transports the encapsulated packet across the network using the foreign protocol. The foreign protocol refers to a network protocol that is different from the protocol specified by the packet.

A VPN relates to a mechanism of tunneling and it provides privacy and authentication on public networks, such as, for example, the Internet. In one embodiment, a VPN may encrypt the packets to improve packet security. For example, a packet from a VPN using an Internet tunnel is encrypted before crossing the Internet and decrypted at the receiving end, typically the sending host's local network (i.e., corporate network).

A host is essentially a node on a network, and it has an IP (Internet Protocol) address. Authentication is a security method which authenticates one network node to another (i.e., proves the identity of the node). A security gateway (SG) is a computer or a group of computers that route packets. In one embodiment, SG also provides filtering and security functions.

Sender node 202 and receiver node 210, in one embodiment, could be a machine, an entity, a cluster of machine, or an individual computer. A machine refers to a computer, a server, or a network router. User entity 212, in one embodiment, could be a machine, a computer, a group of computers, or a corporation. In one embodiment, user entity 212 could be a host, which is connected to an individual user 214.

When sender node 202, in one embodiment, wants to send a packet to receiver node 210, sender node 202 first has to establish a set of tunnels T1, T2, T3 in that exact order. Once the tunnels are established, the packet is transmitted across the network via multiple tunnels to reach receiver node 210. It should be appreciated that tunnel provides security for the message that travels across the network. For example, the security may be a process of encrypting the data. Other nodes or machines may be added in network 200, but they are not necessary to understanding the invention.

Figure 3:
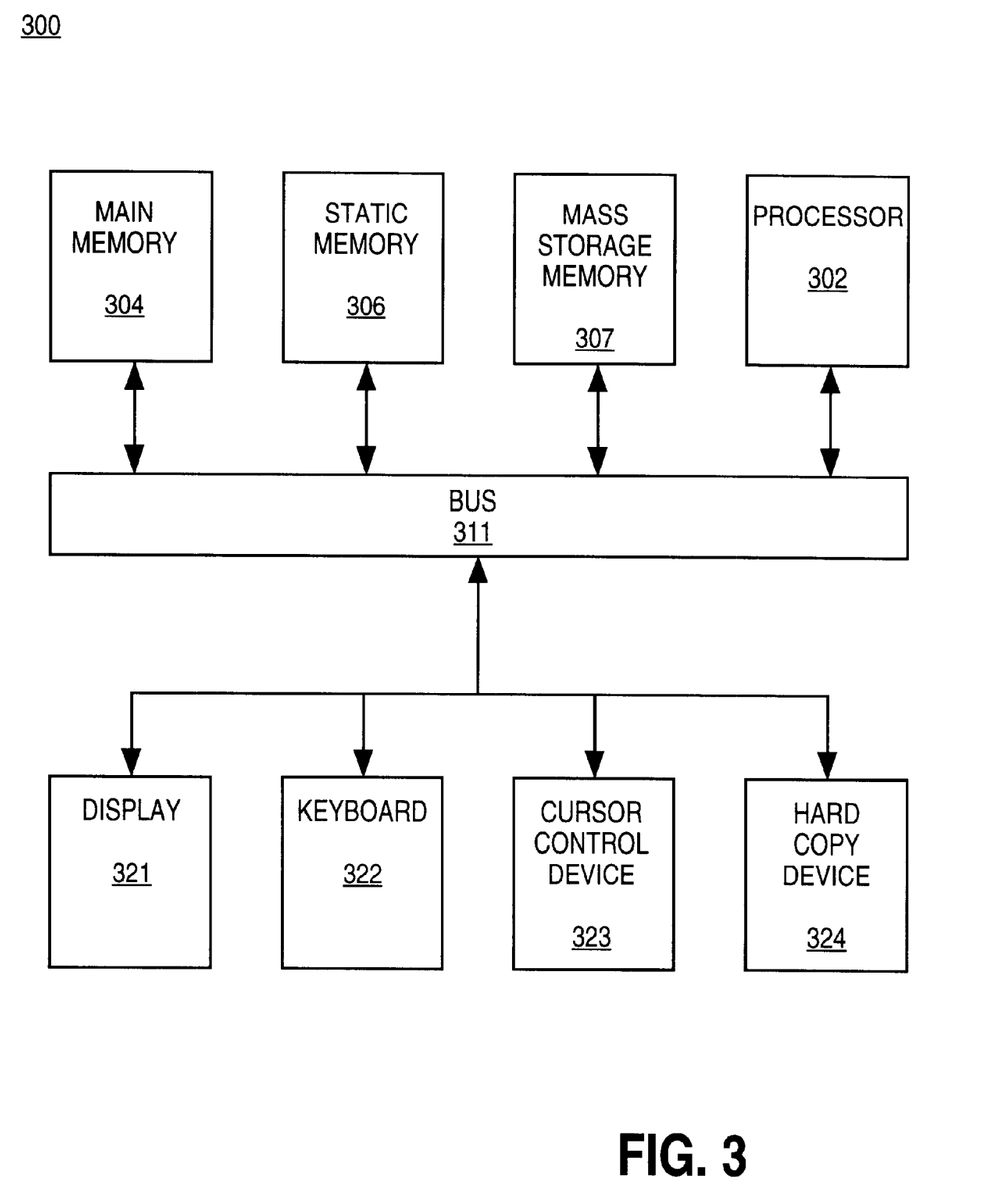
FIG. 3 illustrates one embodiment of a network system used to support network traffic.

FIG. 3 illustrates one embodiment of a system 300 which may be used as a network server, a SG and the like. System 300 comprises a bus or other communication means 311 for communicating information, and a processor 302 coupled with bus 311 for processing information. Processor 302 includes microprocessor, but is not limited to a microprocessor, such as an Intel brand Architecture Microprocessor, manufactured by Intel Corporation of Santa Clara, Calif., the corporate assignee of the present invention. Processor 302 may also be another processor such as the PowerPC™, Alpha™, and the like.

System 300 further comprises a random access memory (RAM), or other dynamic storage device 304 (referred to as main memory) coupled to bus 311 for storing information and instructions to be executed by processor 302. Main memory 304 also may be used for storing temporary variables or other intermediate information during execution of instructions by processor 302. Digital system 300 also comprises a read only memory (ROM) and/or other static storage device 306 coupled to bus 311 for storing static information and instructions for processor 302, and a data storage device 307, such as a magnetic disk or optical disk and its corresponding disk drive. Data storage device 307 is coupled to bus 111 for storing information and instructions.

Digital system 300 may further be coupled to a display device 321, such as a cathode ray tube (CRT) or liquid crystal display (LCD), coupled to bus 311 for displaying information to a computer user. An alphanumeric input device 322, including alphanumeric and other keys, may also be coupled to bus 311 for communicating information and command selections to processor 302. An additional user input device is cursor control 323, such as a mouse, trackball, trackpad, stylus, or cursor direction keys, coupled to bus 311 for communicating direction information and command selections to processor 302, and for controlling cursor movement on display 321.

Another device which may be coupled to bus 311 is hard copy device 324, which may be used for printing instructions, data, or other information on a medium such as paper, film, or similar types of media. Furthermore, a sound recording and playback device, such as a speaker and/or microphone may optionally be coupled to bus 311 for audio interfacing with computer system 300 [100]. Note that any or all of the components of system 300 and associated hardware may be used in the present invention. However, it can be appreciated that other configurations of the computer system may include some or all of the devices.

Figure 4:
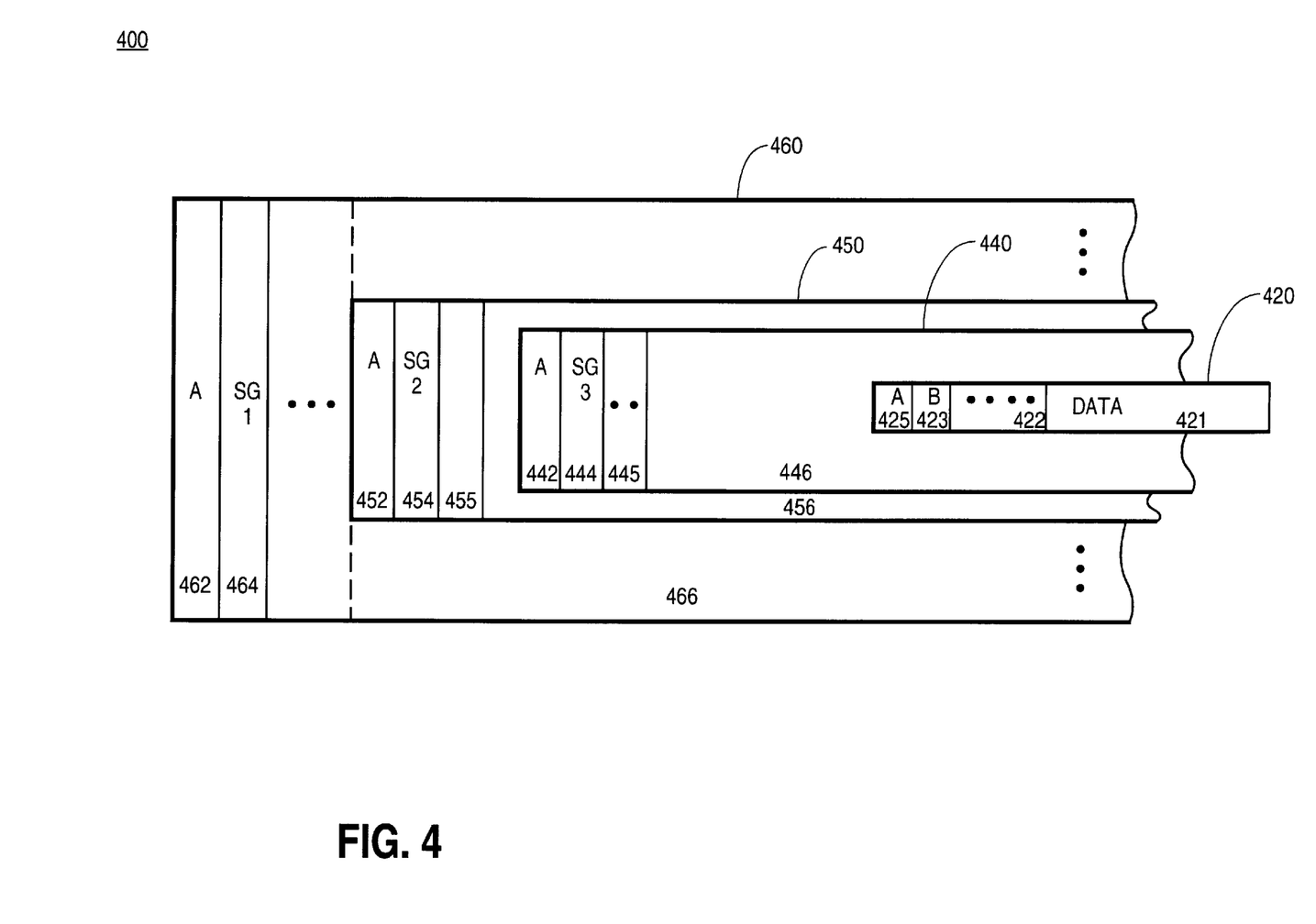
FIG. 4 illustrates one embodiment of a tunnel configuration.

FIG. 4 illustrates one embodiment of a tunnel configuration 400. Data packet 420, and three tunnels 440, 450, and 460 are shown in FIG. 4. Data packet 420 includes a header section and a data section 421. The header section of the data packet 420, in one embodiment, includes a source address, a destination address, a source port, a destination port, and protocol, also known as 5-tuple. In an alternative embodiment, tunnels 440, 450, and 460 are IPSEC (Internet protocol security) tunnels.

Each tunnel, in one embodiment, is organized into a header section and a data section. The data section of the tunnel encapsulates the entire packet or another tunnel, which may further encapsulate the packet. In an alternative embodiment, nested tunnels may be used for transporting a packet. The header section of the tunnel includes, but is not limited to, a field of source address, destination address, and protocol. For example, data section 446 of tunnel 440 encapsulates data packet 420 and data section 456 of tunnel 450 encapsulates tunnel 440. The header section of tunnel 440 includes a source address 442, a destination address 444, and a protocol 445.

Referring back to FIG. 4, tunnel 460, which is the first tunnel from the source node, includes a source node address 462 and a destination address SG1 (security gateway one) 464, which could be VPN 1. The data section 466 of tunnel 460 encapsulates tunnel 450. Tunnel 450 is the second tunnel from the source node and it includes A452 as the source address and SG2 (security gateway two) 454 as the destination address. The data section 456 of tunnel 450 encapsulates tunnel 440. Tunnel 440 is the third tunnel from the source node and it includes A442 as the source address and SG3 (security gateway three) 444 as the destination address. The data section 446 of tunnel 440 encapsulates data packet 420.

In operation, a data packet, such as, for example, data packet 420 is to be transmitted from address A to address B. When data packet 420 indicates the tunneling process for the packet security, three tunnels 440, 450, 460 may be established. After passing a tunnel successfully, a layer of encapsulation that corresponds to the tunnel just passed is removed and the next encapsulation, if any, is used for the packet transaction. When all encapsulations of the tunnels are removed, the data packet 420 is transmitted to the destination node.

Figure 5:
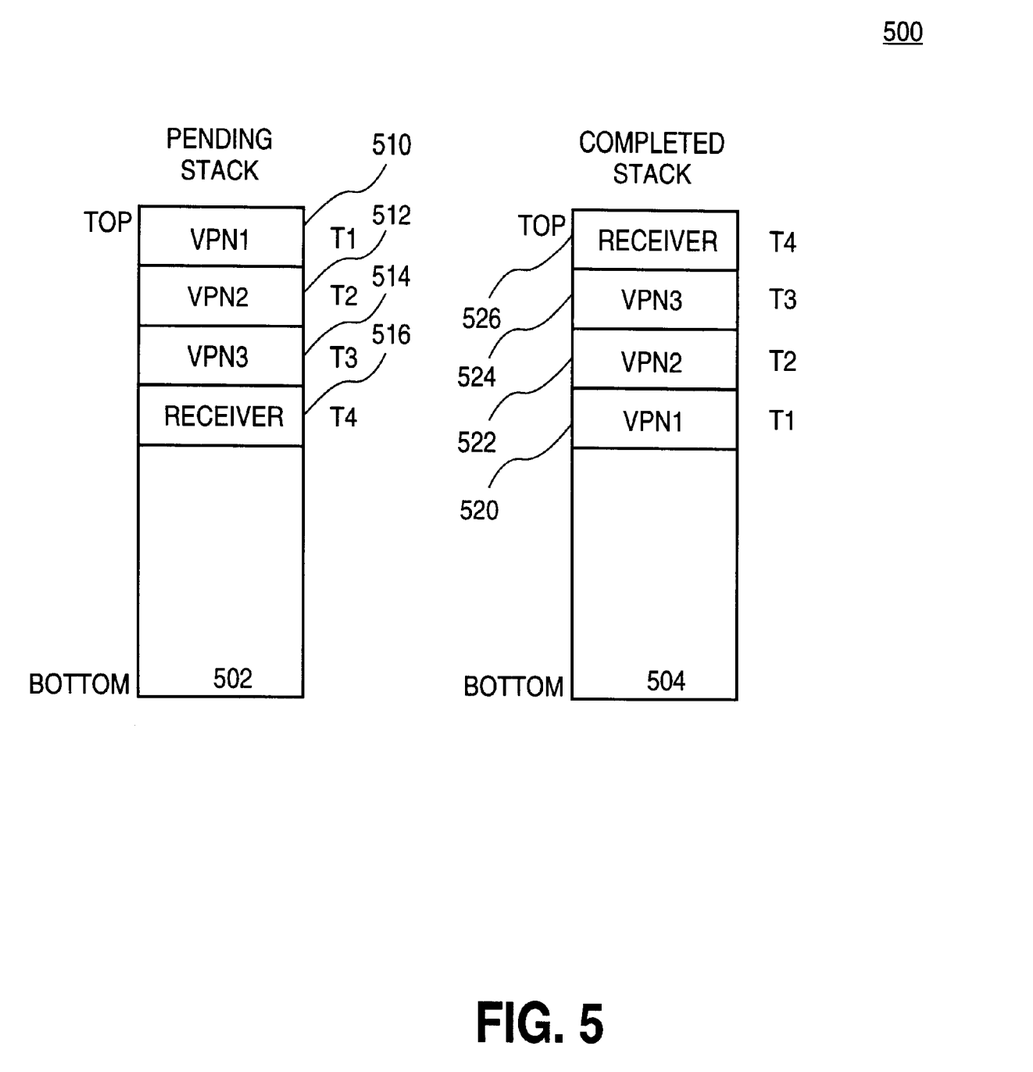
FIG. 5 is a block diagram illustrating one embodiment of pending stack and completed stack.

FIG. 5 is a block diagram 500 illustrating one embodiment of a storage configuration having a pending stack 502 and a completed stack 504. The pending stack 502 stores multiple actions that indicate a sequence of tunnels to be built. In one embodiment, the physical storage locations of the pending stack indicates an order of actions to be performed. Actions, in one embodiment, include transport actions and tunnel actions. The completed stack 504 stores multiple actions that indicate a sequence of tunnels to be torn down. Like the pending stack, the physical storage locations of the completed stack indicates an order of actions to be performed.

For example, pending stack 502 contains action VPN1 510, VPN2 512, VPN3 514, and receiver 516 where action VPN1 510 is stored at the top of pending stack 502 and action receiver 516 is stored at the bottom of the pending stack. Action VPN1 510, in one embodiment, requires the network to establish a tunnel between the source node and VPN1. During the execution, action VPN1 510 will be executed first and action receiver 516 will be executed last. Similarly, completed stack 504 contains action receiver 526, VPN3 524, VPN2 522, and VPN1 520 where action receiver 526 is stored at the top of completed stack 504 and action VPN1 520 is stored at the bottom of completed stack 504. Like pending stack 502, action receiver 526 is performed first and VPN1 520 is performed last.

In operation, if a transport rule, such as, for example, a IPSEC transport mode rule, is matched with the packet, a corresponding transport action associated with the transport rule is pushed onto pending stack 502. In one embodiment, the matching process involves a comparison between the 5-tuple of the packet and the 5-tuple listed in the rule. Similarly, if a tunnel rule, such as, for example, a IPSEC tunnel mode rule, is matched with the packet, a corresponding tunnel action associated with the tunnel rule is pushed onto pending stack 502. This is repeated until no more tunnel rules match. After completion of rule evaluation, pending stack 502 is ready for execution.

During the execution, the action situated on the top of pending stack 502 is popped and the action is executed. If the action is successfully executed, the action is pushed onto completed stack 504. As discussed previously, the action could, for example, build a tunnel. The next action from the top of pending stack 502 is popped and the execution is performed. The process repeats until the bottom of pending stack 502 is reached. When all actions are executed successfully, completed stack 504 stores all actions in an order where the first action executed is located at the bottom of completed stack 504 and the last action executed is located on the top of completed stack 504. In other words, completed stack 504 stores the actions in a reverse order as the actions stored in pending stack 502.

However, if an action from pending stack 502 is executed unsuccessfully and completed stack 504 is not empty, a process of tearing down or removing the established tunnels should be performed. Since completed stack 504 stores the actions in an opposite order as the actions stored in pending stack 502, the tunnel that was built from the last successful action is torn down first and the tunnel built from the first successful action is torn down last. In other words, the tunnel situated the farthest from the source node is torn down first and the tunnel situated the closest from the source node torn down last. Thus, completed stack 504 gives a sequence of removing unnecessary tunnels.

Setting up a tunnel, tearing down a tunnel, or maintaining a tunnel consumes network resources. Thus, the overall performance of a network would be improved if building unnecessary tunnels are reduced, which also reduces the number of unnecessary tunnels to be removed. Pending stack 502, in one embodiment, facilitates building one tunnel at a given time since process pops one action from pending stack 502 at a time. Similarly, completed stack 504 facilitates removing or tearing down one tunnel at a given time. Accordingly, setting up or tearing down one tunnel at a time reduces unnecessary tunnels to be built, and consequently, reduces unnecessary tunnels to be torn down. For example, if ten tunnels are needed for transporting a packet and if they are established at the same time, nine tunnels may require to be torn down when one of the ten tunnels fails to establish. Also, if the tunnels are established one at a time and if the fifth tunnel has failed to establish, only four tunnels are required to be torn down.

Figure 6:
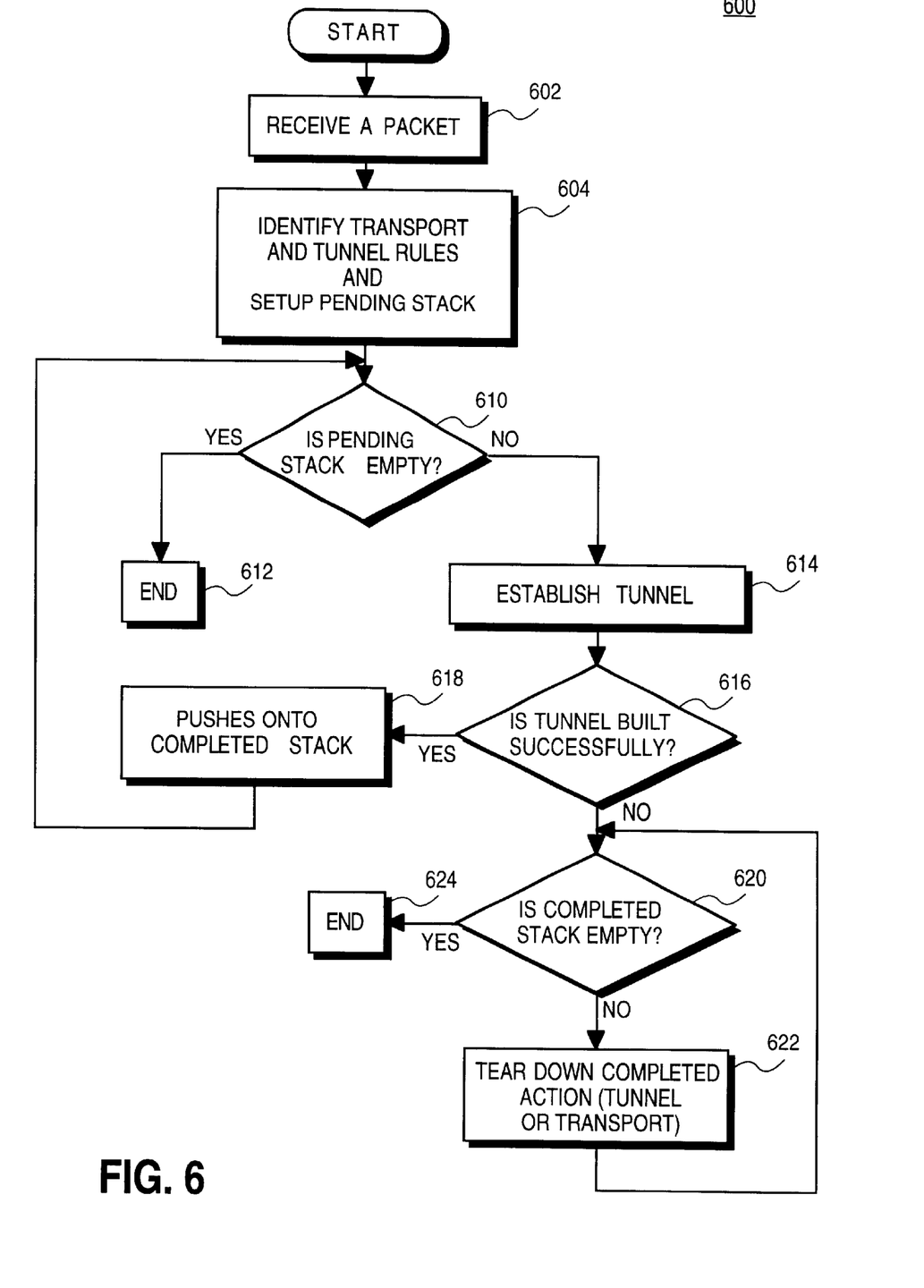
FIG. 6 is a flowchart illustrating an embodiment of a process for establishing a tunnel.

FIG. 6 is a flowchart 600 illustrating an embodiment of a process for establishing tunnels. A process begins at start block and proceeds to block 602. At block 602, a packet is received. After block 602, the process proceeds to block 604 where the process identifies transport and tunnel rules and sets up the pending stack. Upon moving to block 610, the process examines whether the pending stack is empty.

If block 610 is true, the process proceeds to block 612, where the process ends. On the other hand, if block 610 is false, which indicates that the pending stack is not empty, the process proceeds from block 610 to block 614 where the process establishes a tunnel in response to an action stored at the pending stack. After block 614, the process proceeds to block 616. At block 616, the process examines whether the tunnel is established successfully.

If the block 616 is true, the process proceeds from block 616 to block 618. At block 618, the process pushes the action onto the completed stack and the process loops back to block 610 to repeat the steps indicated in block 610. If block 616 is false, which indicates that the tunnel has failed to establish, the process proceeds from block 616 to block 620.

At block 620, the process examines whether the completed stack is empty. If block 620 is true, which indicates that the completed stack is empty, the process proceeds to block 624 where the process ends. On the other hand, if block 620 is false, which indicates that the completed stack is not empty, the process proceeds from block 620 to block 622. At block 622, the process tears down an established tunnel in response to the completed stack. After block 622, the process loops back to block 620 to repeat the steps indicated in block 620.

Figure 7:
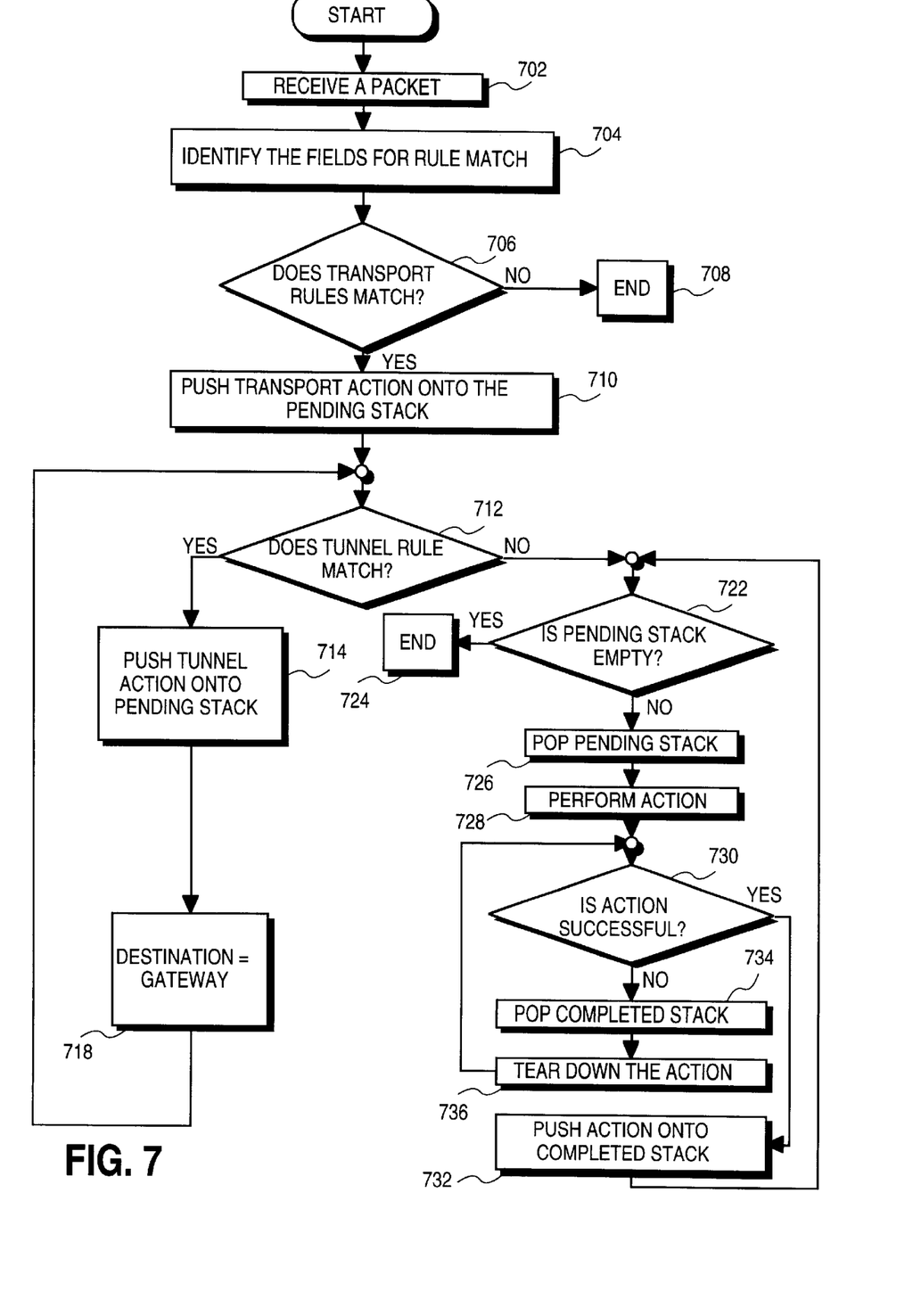
FIG. 7 is a flowchart illustrating an embodiment of a process for setting up tunnels using two stacks.

FIG. 7 is a flowchart 700 illustrating an embodiment of a process for setting up tunnels using two stacks. The process begins at the start block and proceeds to block 702. At block 702, the process receives a packet and proceeds to block 704. At block 704, fields of source address, destination address, and protocols of the packet are identified. After block 704, the process examines whether the transport rules match with the packet parameters, such as, for example, the 5-tuple, at block 706. If block 706 is false, which indicates that the transport rules does not match, the process moves to block 708 where the process ends.

If block 706 is true, which indicates that at least a transport rule is matched, the process proceeds to block 710. At block 710, a corresponding transport action associated with the transport rule is pushed onto the pending stack. After block 710, the process proceeds to 712 where the process examines whether tunnel rules may be matched.

If block 712 is true, which indicates that the tunnel rule is matched, the process proceeds from block 712 to block 714. At block 714, a corresponding tunnel action associated with the tunnel rule is pushed onto the pending stack. After block 714, the process proceeds to block 718 where the destination is set to the security gateway. After block 718, the process proceeds to block 712, where the process is repeated.

If block 712 is false, which indicates that the tunnel rule has failed to match with the packet parameters, the process proceeds from block 712 to block 722 where the process examines whether the pending stack is empty. If block 722 is true, which indicates that the pending state is empty, the process proceeds to block 724, where the process ends. If the block 722 is false, which indicates that the pending stack is not empty, the process proceeds from block 722 to block 726.

At block 726, an action from the pending stack is popped. The process subsequently, proceeds to block 728. At block 728, a tunnel or transport action is performed. After block 728, the process proceeds to block 730 where the process examines whether the action was performed successfully. If block 730 is true, which indicates that the action was performed successfully, the process proceeds from block 730 to block 732 where the process pushes the action onto the completed stack. After block 732, the process proceeds to block 722 where the steps listed in block 722 is repeated.

If block 730 is false, which indicates that the tunnel action failed, the process proceeds from block 730 to block 734. At block 734, an action is popped from the completed stack. After block 734, the process proceeds from block 734 to block 736. At block 736, a corresponding action is torn down. After block 736, the process loops back to block 730 where the steps listed in block 730 is repeated.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

Thus, a method and a system for establishing at least one tunnel using a pending stack and a completed stack have been described.

We claim:

1. A method for establishing network tunnels comprising:
   identifying a transport action in response to packet parameters;
   pushing at least one said transport action onto a pending stack;
   identifying a tunnel action in response to said packet parameters;
   pushing at least one said tunnel action onto said pending stack; and
   setting up at least one tunnel in response to said pending stack, said tunnel action stored at top of said pending stack being performed first and said tunnel action stored at bottom of said pending stack being performed last.

2. The method of claim 1, further comprising:
   receiving a packet over a network;
   identifying transport rules in response to said packet; and
   identifying tunnel rules in response to said packet.

3. The method of claim 2, wherein said receiving a data packet includes identifying a TCP/IP ("Transmission Control Protocol/Internet Protocol") data packet and parsing TCP/IP fields of protocol, source addresses, and destination addresses.

4. The method of claim 1 further comprising:
   popping an action from said pending stack; and
   pushing said action onto a completed stack when said action is performed successfully.

5. The method of claim 1 further comprising:
   popping an action from a completed stack action when said tunnel has failed to establish; and
   tearing down at least one tunnel in response to said action.

6. The method of claim 5 further comprising continuing to tear down tunnels until said completed stack becomes empty.

7. The method of claim 1, wherein said identifying transport actions from transport rules further includes defining an IPSEC transport rule in response to source address, destination address, and protocol of each packet.

8. The method of claim 1, wherein said identifying tunnel actions from tunnel rules further includes defining an IPSEC tunnel rule in response to source address, destination address, and protocol of said packet.

9. The method of claim 8, wherein said defining said IPSEC tunnel rule further includes identifying virtual private network ("VPN") for tunnel connections.

10. An article of manufacture for establishing network tunnels to improve network security, the article of manufacture comprising a machine readable medium having machine readable program code embodied in the medium, the program code comprising:
    identifying transport actions from transport rules;
    pushing at least one said transport action onto a pending stack;
    identifying tunnel actions from tunnel rules;
    pushing at least one tunnel action onto said pending stack; and
    setting up at least one tunnel in response to said pending stack, said tunnel action stored at top of said pending stack being performed first and said tunnel action stored at bottom of said pending stack being performed last.

11. The article of manufacture of claim 10 further comprising:
    popping an action from said pending stack; and
    pushing said action onto a completed stack when said tunnel action is performed successfully.

12. The article of manufacture of claim 10 further comprising:
    obtaining an action from said completed stack after a tunnel has failed to establish; and
    removing at least one tunnel in response to said action.

13. The article of manufacture of claim 10 further comprising continuing to remove tunnels until said completed stack becomes empty.

14. The article of manufacture of claim 10, wherein said network tunnels are IPSEC tunnels.

15. The article of manufacture of claim 10, wherein said identifying transport actions from transport rules further includes defining an IPSEC transport rule in response to source address, destination address, and protocol of each packet.

16. The article of manufacture of claim 10, wherein said identifying tunnel actions from tunnel rules further includes defining an IPSEC tunnel rule in response to source address, destination address, and protocol of each packet.

17. The article of manufacture of claim 10, wherein said defining said IPSEC tunnel rule further includes identifying intermediate virtual private network ("VPN").

18. An apparatus for establishing network tunnels comprising:
    means for identifying transport actions from transport rules;
    means for pushing at least one said transport action onto a pending stack;
    means for identifying tunnel actions from tunnel rules;
    means for pushing at least one tunnel action onto said pending stack; and
    means for setting up at least one tunnel in response to said pending stack, said tunnel action stored at top of said pending stack being performed first and said tunnel action stored at bottom of said pending stack being performed last.

19. An apparatus of claim 18 further comprising:
    means for obtaining an action from said pending stack; and
    means for storing said action onto a completed stack when said action is performed successfully.

20. An apparatus of claim 18 further comprising: means for obtaining an action from said completed stack after a tunnel has failed to establish; and
    means for removing at least one tunnel in response to said tunnel action.

21. An apparatus of claim further comprising means for continuing to remove tunnels until said completed stack becomes empty.

* * * * *

UNITED STATES PATENT AND TRADEMARK OFFICE
CERTIFICATE OF CORRECTION

PATENT NO.    : 6,636,520 B1
DATED         : October 21, 2003
INVENTOR(S)   : Jason et al.

It is certified that error appears in the above-identified patent and that said Letters Patent is hereby corrected as shown below:

<u>Column 2,</u>
Line 36, after "those of", delete "[or]"

<u>Column 4,</u>
Line 35, after "204", delete "[202]".
Line 37, after "206", delete "[202]".

<u>Column 5,</u>
Line 60, after "300", delete "[100]".

Signed and Sealed this

Sixteenth Day of March, 2004

JON W. DUDAS
*Acting Director of the United States Patent and Trademark Office*